(12) United States Patent
Moon et al.

(10) Patent No.: US 6,841,768 B2
(45) Date of Patent: Jan. 11, 2005

(54) THREE DIMENSIONAL CONICAL HORN ANTENNA COUPLED IMAGE DETECTOR AND THE MANUFACTURING METHOD THEREOF

(75) Inventors: Sung Moon, Namyangju (KR); Kun Tae Kim, Goyang (KR)

(73) Assignee: Korea Institute of Science and Technology, Seoul (KR)

( * ) Notice: Subject to any disclaimer, the term of this patent is extended or adjusted under 35 U.S.C. 154(b) by 61 days.

(21) Appl. No.: 09/986,507

(22) Filed: Nov. 9, 2001

(65) Prior Publication Data

US 2003/0089842 A1 May 15, 2003

(51) Int. Cl.[7] .......................... H01L 27/00; H01Q 13/00
(52) U.S. Cl. .................................... 250/208.1; 343/772
(58) Field of Search .......................... 250/208.1–208.2, 250/227.11, 227.14, 227.2, 227.21, 227.24, 353, 338.1; 343/786, 772

(56) References Cited

U.S. PATENT DOCUMENTS 4,214,165 A * 7/1980 Asawa
4,463,262 A * 7/1984 Contreras
4,532,424 A * 7/1985 Cheung
5,604,607 A * 2/1997 Mirzaoff

OTHER PUBLICATIONS

Sung Moon et al., "Fabrication of Thz Band Horn Shape Antenna", 2000 Fall Thesis Competition, Korea Electrical Study Association, p. 581–682, Nov. 25, 2000, along with an English language abstract.

* cited by examiner

Primary Examiner—David Porta
Assistant Examiner—David C. Meyer
(74) Attorney, Agent, or Firm—Greenblum & Bernstein, P.L.C.

(57) ABSTRACT

The present invention relates to three dimensional conical horn antenna coupled image detectors and the manufacturing method thereof. More specifically, the present invention relates to the method of manufacturing an image detector by coupling three dimensional conical horn antenna with the image detector which are constructed using the Micro Electro Mechanical System (MEMS) Technology that improves the sensitivity of the image detector.

2 Claims, 8 Drawing Sheets

THREE DIMENSIONAL CONICAL HORN ANTENNA COUPLED IMAGE DETECTOR AND THE MANUFACTURING METHOD THEREOF

BACKGROUND OF THE INVENTION

The present invention relates to three dimensional conical horn antenna coupled image detectors and the manufacturing method thereof. More specifically, the present invention relates to the method of manufacturing an image detector by coupling three dimensional conical horn antenna with the image detector which are constructed using the Micro Electro Mechanical System (MEMS) Technology that improves the sensitivity of the image detector.

The conventional method of improving the performance of an image detector has normally been relied on the coupling two dimensional antenna with the image detector.

As illustrated in FIG. 1a and FIG. 1b, the configuration diagram of an conventional conical horn antenna coupled image detector shows that the image detector 3 is located within the waveguide 5 of the conical horn antenna constructed on the substrate 1. The shape of the image detector 3 is a square type.

However, some of the problems of the conventional configuration for image detectors are as follows;

Firstly, the coupling of two dimensional antenna results a significant increase in the size of image detectors causing difficulties in an array type manufacturing.

Secondly, the conventional image detectors are not effective for coupling with conical horn antenna due to their square shape.

Thirdly, the floating structure of the conventional image detectors for thermal isolation could cause a serious damage to the structure during the coupling with antenna.

Fourthly, the loss of light receiving part of the conventional antenna coupled image detectors becomes large because the thermal isolation legs as well as absorption layer are included in the antenna simultaneously.

SUMMARY OF THE INVENTION

The present invention is designed to overcome the above problems of prior arts. The object of the invention is to provide an image detector that can effectively couple with conical horn antenna using the MEMS technology. Another object is to provide the manufacturing method of an image detector which is coupled with three dimensional conical horn antenna.

In order to achieve the stated objectives, the present invention mainly focuses on the manufacturing process technology of the support which supports the conical horn antenna, the circular absorption layer which has the identical diameter to that of a bottom cross section of the waveguide of the antenna and the circular shaped thermal isolation leg.

Figure 1A:
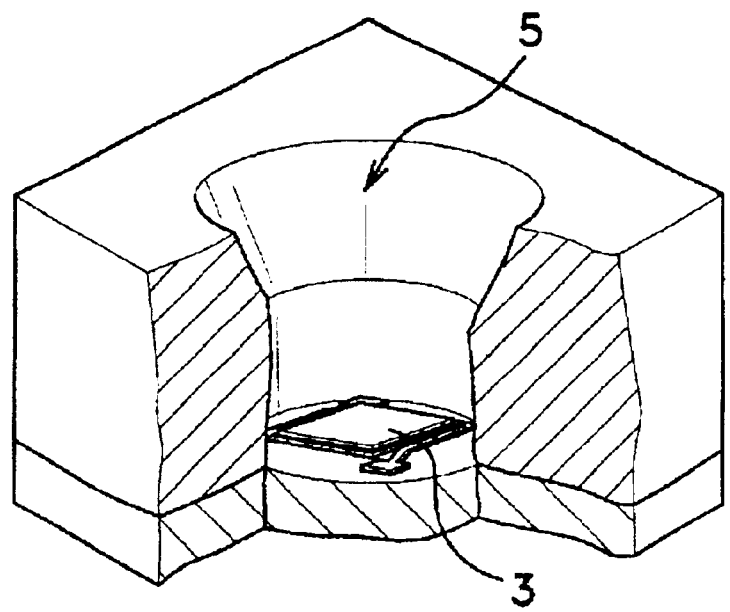
FIG. 1a and FIG. 1b, are configuration diagrams of an conventional conical horn antenna coupled image detector.
Figure 1B:
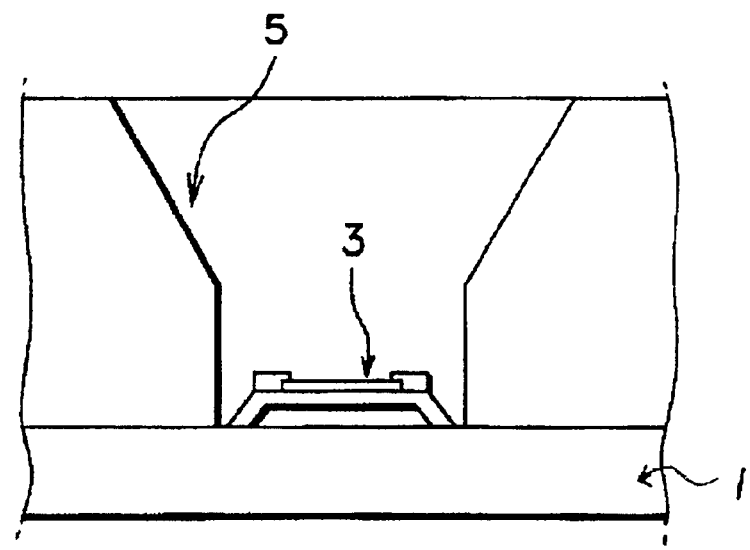
Figure 2:
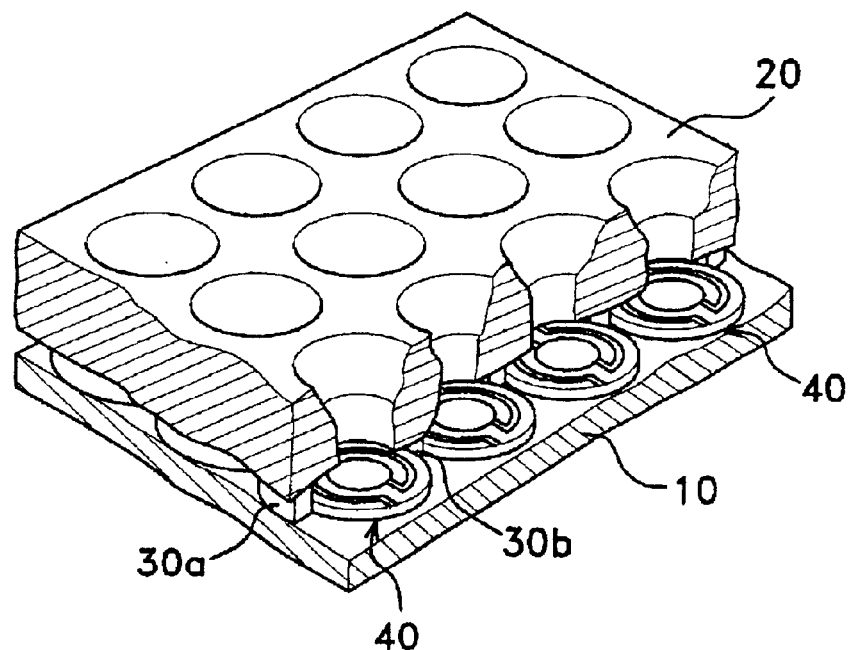
Figure 3:
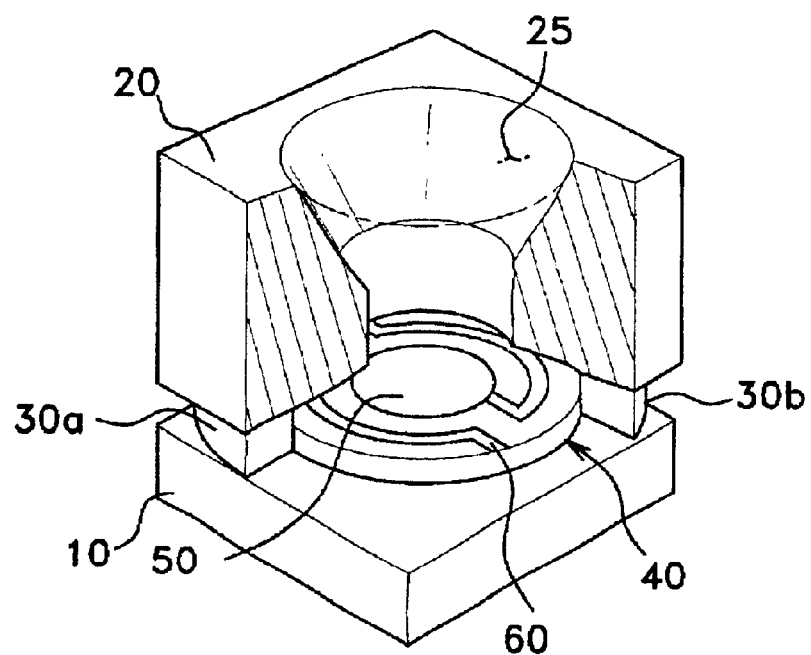
Figure 4:
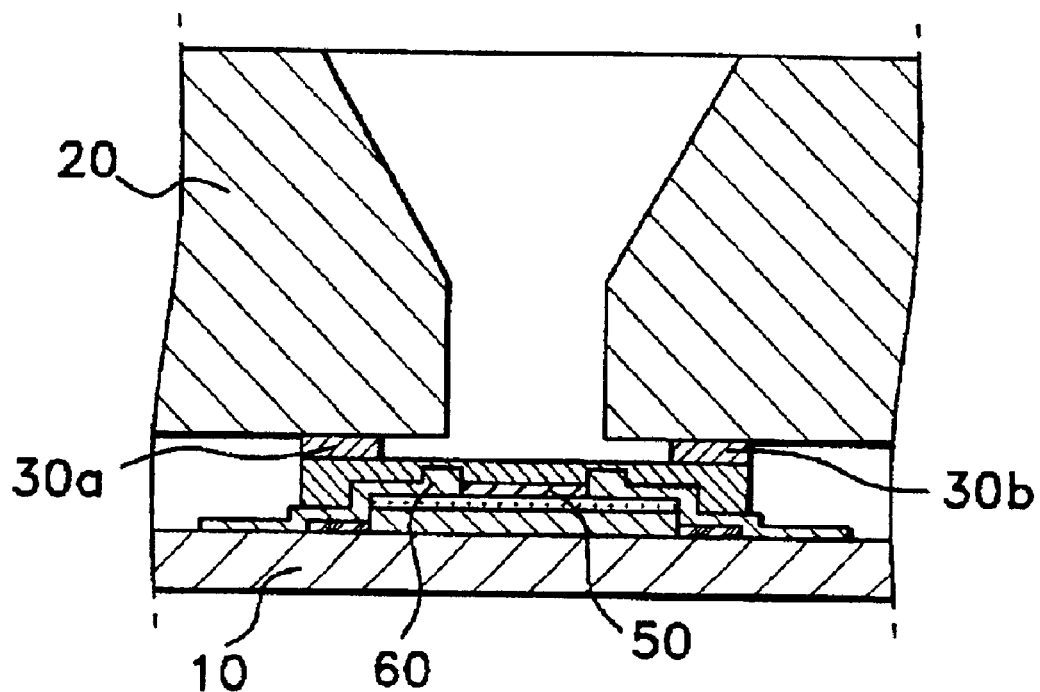

From FIG. 2 to FIG. 4 represent the basic configuration diagram, single isolated configuration diagram and a cross section of the image detector coupled with conical horn antenna array according to the present invention.

Figure 5A:
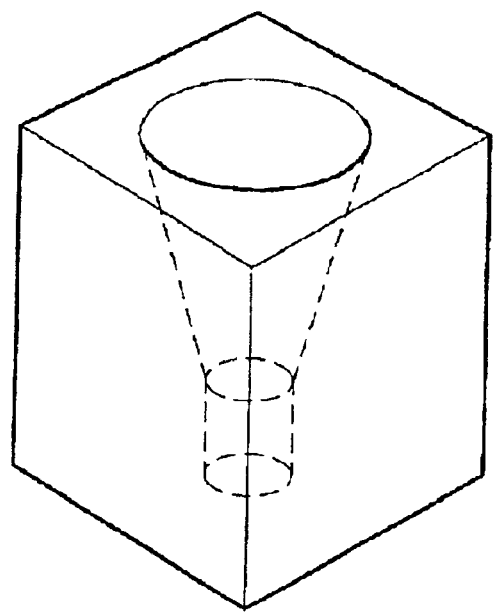
Figure 5B:
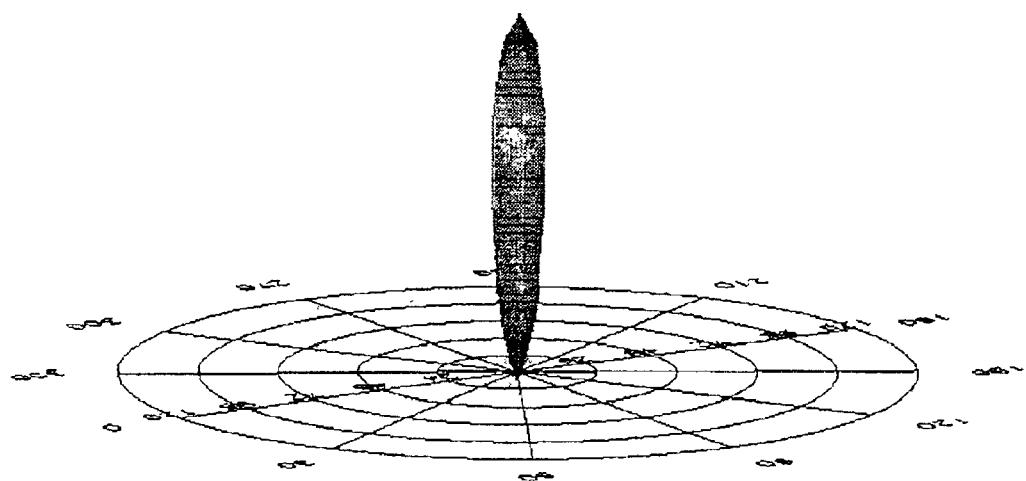

FIG. 5a and FIG. 5b show an overall configuration of the conical horn antenna and the simulation results of its directivity respectively.

Figure 6A:
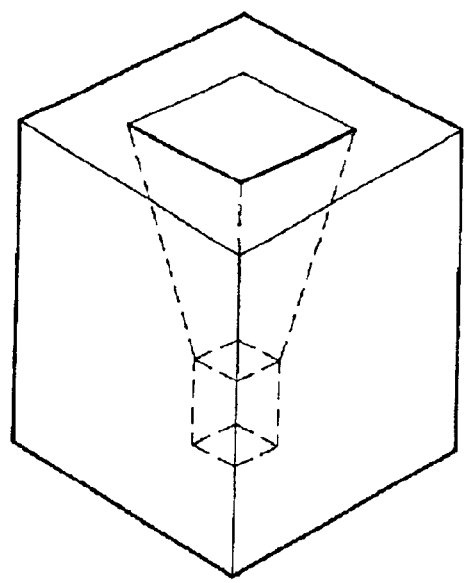
Figure 6B:
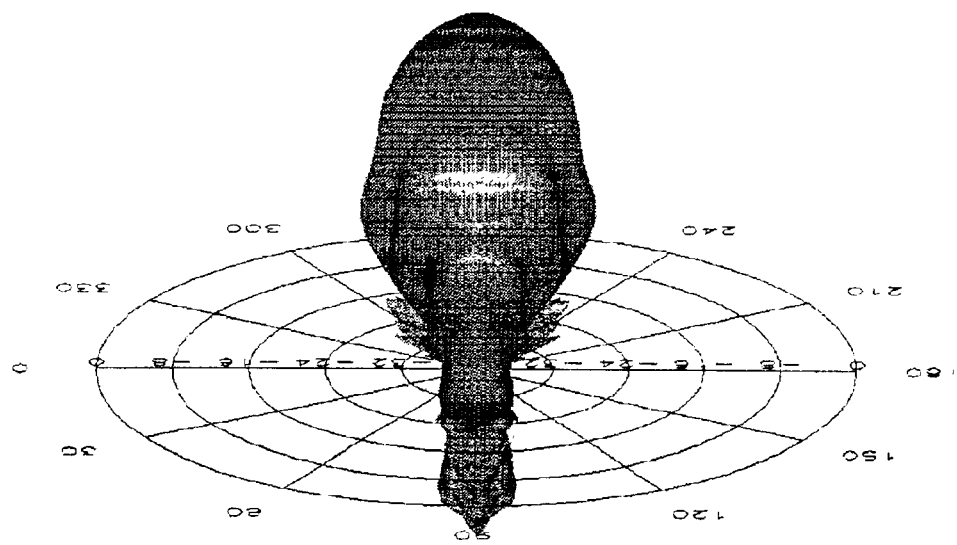

FIG. 6a and FIG. 6b show an overall configuration of the square horn antenna and the simulation results of its directivity respectively.

Figure 7:
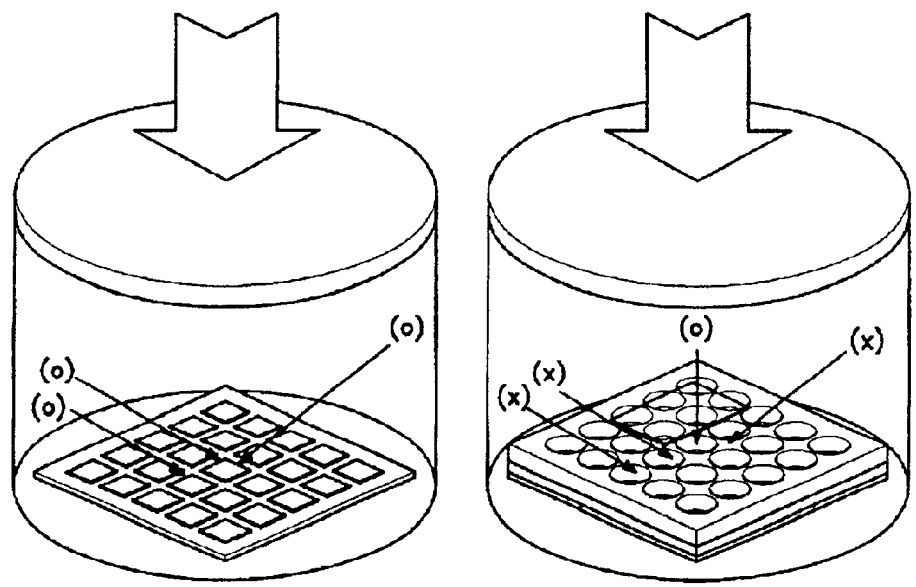

FIG. 7 is a configuration diagram which shows the increase in the signal to noise ratio (S/N) as a result of the directionality improvement due to the coupling of the conical horn antenna.

Figure 8:
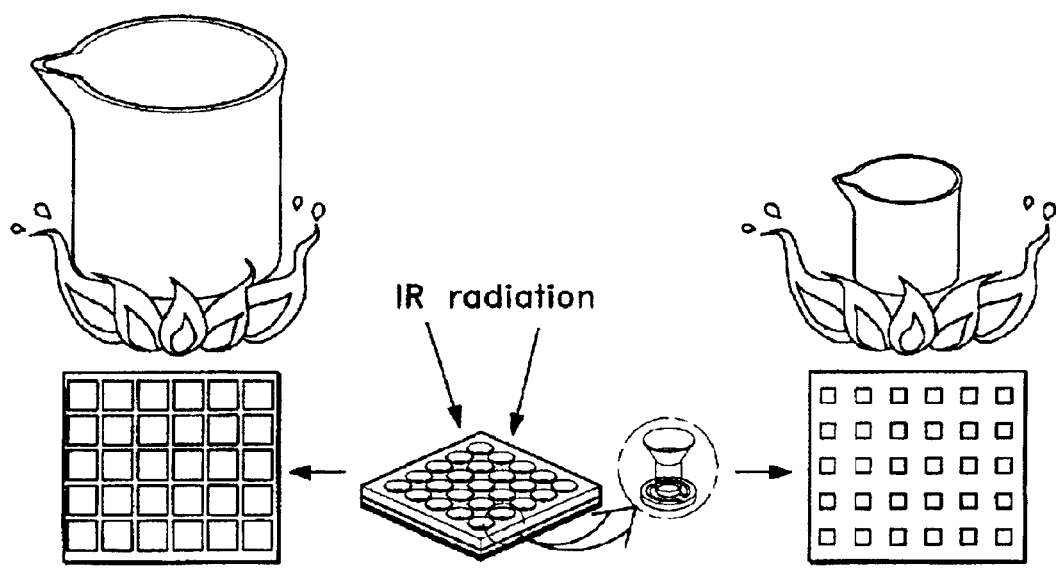

FIG. 8 a configuration diagram which shows the decrease in the power consumption by reducing the size of the image detector, consequently lowering the thermal mass and thermal time constant.

FIGS. 9a–9h and 10a–10f show the manufacturing process diagram of the image detector coupled with three dimensional conical horn antenna according to the present invention.

DESCRIPTION OF THE NUMERIC ON THE MAIN PARTS OF THE DRAWINGS

10: Substrate
20: Horn Antenna Structure
25: Waveguide
30a, 30b: Supports
40: Image Detector
50: Absorption Layer
60: Thermal Isolation Leg
100: Substrate
102: Sacrificial Oxide Layer
104, 108, 112, 116, 120, 124, 128: Etching Mask
106: First Silicon Nitride Layer
110: Vanadium Oxide Layer
114: Conductive Layer
118: Second Silicon Nitride Layer
122: Third Silicon Nitride Layer
126: Side Wall Space

DETAILED DESCRIPTION OF THE EMBODIMENTS

Hereinafter, preferred embodiments of the present invention will be described in detail with reference to the accompanying drawings.

From FIG. 2 to FIG. 4 represent the basic configuration diagram, single isolated configuration diagram and a cross section of the image detector coupled with conical horn antenna array according to the present invention.

As shown in FIG. 2, FIG. 3 and FIG. 4, the conical horn antenna structure 20 is supported by the supports 30a, 30b on the substrate 10 and the waveguide 25 of the conical horn antenna is formed at the center of the conical horn antenna structure 20. The image detector 40 is formed at the lower section of the waveguide 25 and the image detector 40 comprises an absorption layer 50 whose diameter is identical to that of a bottom cross section of the waveguide 25. The image detector 40 also includes a circular shaped thermal isolation leg 60, which spans a greater distance than the diameter of the horn antenna wave guide 25, and is formed on the surface of the image detector 40.

The supports 30a, 30b prevent the absorption layer 50 of the image detector from any damages due to its floatation above the substrate 10 at the time of coupling between the image detector 40 and the conical horn antenna. Also, in order to maximize the coupling efficiency between the conical horn antenna and the image detector 40, the diameter of the waveguide of the conical horn antenna coincides with the diameter of the absorption layer 30.

The thermal isolation leg 60, which is formed in a circular shape on the surface of the image detector 40 so it reduces the thermal conductivity and improves the sensitivity of the image detector 40.

In FIG. 5a and FIG. 5b show an overall configuration of the conical horn antenna and the simulation results of its directivity respectively. FIG. 6a and FIG. 6b show an overall configuration of the square horn antenna and the simulation results of its directivity respectively.

From the comparison of the directionality between the conical horn antenna and the square horn antenna, it can be seen that the directionality of the conical horn antenna is superior than the square horn antenna.

FIG. 7 is a configuration diagram which shows the increase in the signal to noise ratio (S/N) as a result of the directionality improvement due to the coupling of the conical horn antenna. FIG. 8 a configuration diagram which shows the decrease in the power consumption by reducing the size of the image detector, consequently lowering the thermal mass and thermal time constant.

Figure 9:
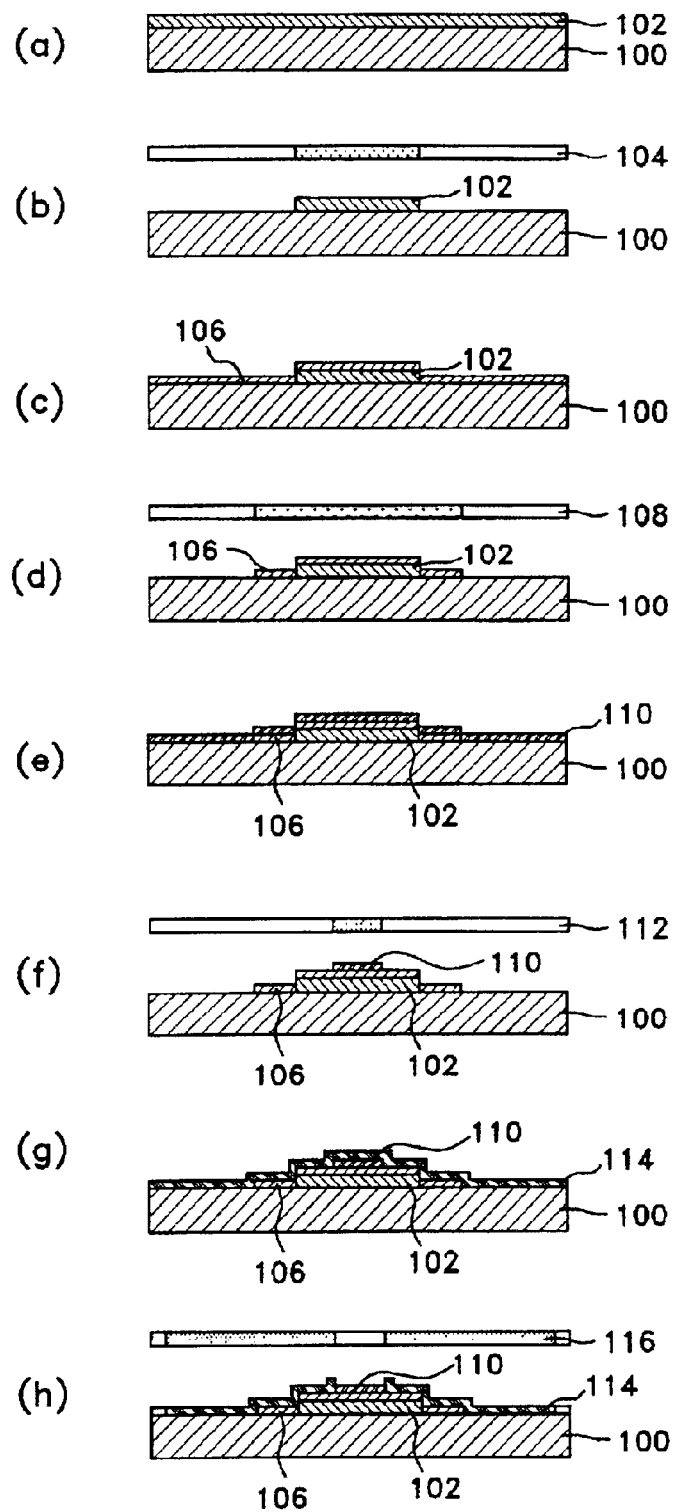
Figure 10:
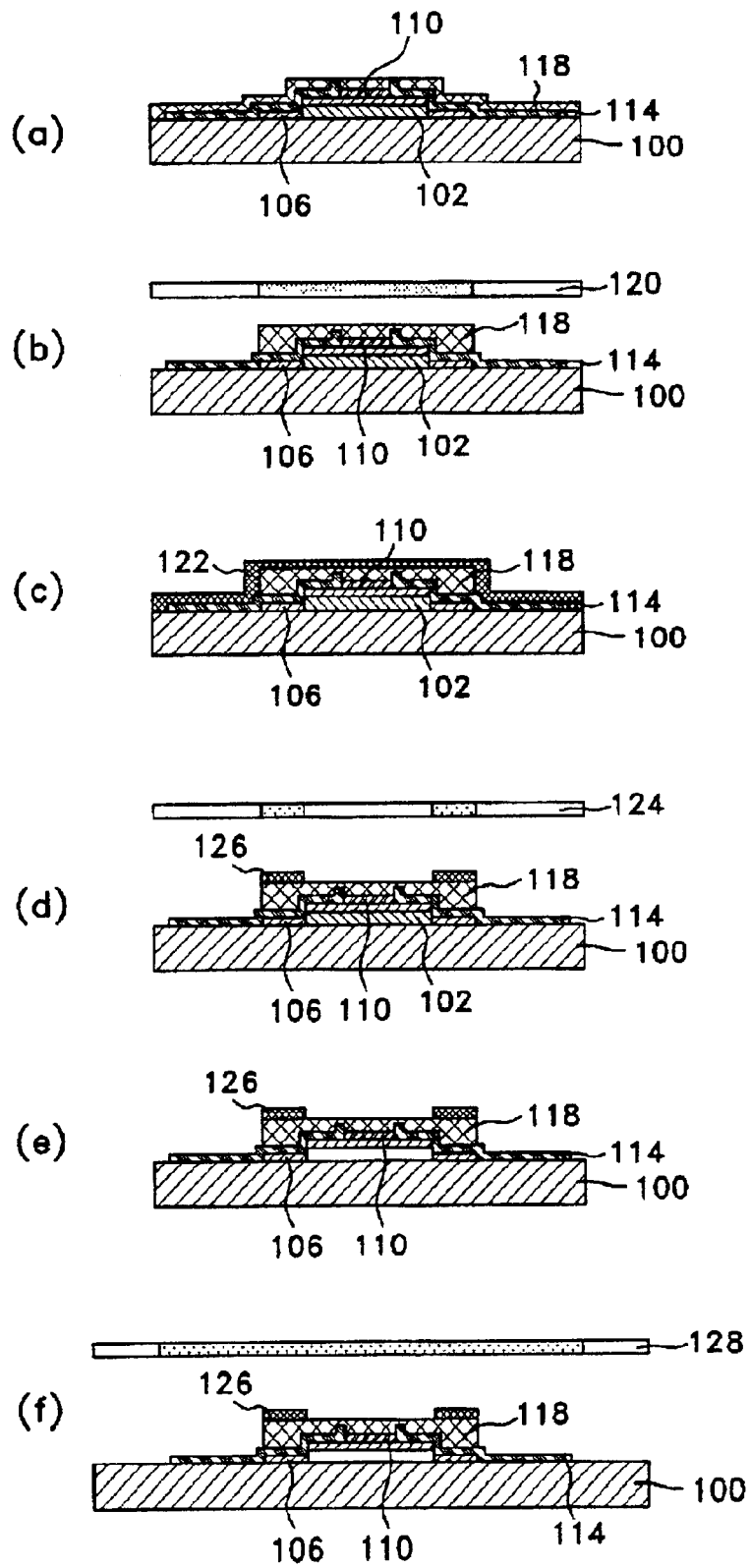

FIG. 9a and FIG. 10f show the manufacturing process diagram of the image detector coupled with three dimensional conical horn antenna according to the present invention.

According to FIG. 9a and FIG. 9b, the pattern for the sacrificial layer 102 is formed by performing a patterning process using the etching mask 104 so as to form the thermal isolation leg 60 of the image detector 40 after depositing a polyimide layer with a thickness 2.0–2.5 $\mu$m as a sacrificial layer on the substrate 100.

In this case, the pattern size of the sacrificial layer 102 is identical to the external diameter of the thermal isolation leg 60 of the image detector.

According to FIG. 9c and FIG. 9d, the pattern for the first silicon nitride layer 106 is formed by performing a patterning process using the etching mask 108 after depositing the first silicon nitride layer 106 (Si3N4) on the whole surface of the above resulting product.

According to FIG. 9e and FIG. 9f, the pattern for the vanadium oxide layer 110 is formed by performing a patterning process using the etching mask 112 after depositing the vanadium oxide layer 110 (VOx) on the whole surface of the above resulting product in order to form the absorption layer 50 of the image detector 40.

In this case, the pattern size of the vanadium oxide layer 110 is identical to the diameter of the absorption layer 50 of the image detector 40.

According to FIG. 9g and FIG. 9h, the pattern for the conductive layer 114 is formed by performing a patterning process using the etching mask 116 after depositing a Chrome layer (Cr) as the conductive layer 114 on the whole surface of the above resulting product.

In this case, only the region around the conductive layer 114 corresponding to the absorption layer 50 of the image detector 40 is removed by etching.

According to FIG. 10a and FIG. 10b, the pattern for the second silicon nitride layer 118 is formed by performing a patterning process using the etching mask 120 after depositing the second silicon nitride layer 118 (Si3N4) on the whole surface of the above resulting product.

According to FIG. 10c and FIG. 10d, the pattern for the side wall space 126 is formed by performing a patterning process using the etching mask 124 after depositing the third silicon nitride layer 122 (Si3N4) on the whole surface of the above resulting product in order to form a side wall space.

According to FIG. 10e and FIG. 10f, the final three dimensional conical horn antenna coupled image detector is completed by constructing a structure that can be aligned using the negative type photoresist etching mask 128 after removing the sacrificial layer 102 from the above resulting product.

As illustrated in FIG. 3, the three dimensional conical horn antenna coupled image detector is finally manufactured.

The advantages of the three dimensional conical horn antenna coupled image detector according to the present invention are as follows;

Firstly, the crosstalk between the pixels in the array can be reduced through an improvement in directionality by coupling the image detector with three dimensional conical horn antenna with a superior directionality. Also, the circular waveguide improves the value of S/N ratio by acting as a high pass filter.

Secondly, the power consumption can be reduced through a reduction in the size of the image detector and it can also be used as a high speed image detector due to its low thermal mass and thermal time constant value.

Thirdly, the sensitivity can be improved by lowering the conductivity value through the construction of circular shaped thermal isolation legs rather than a linear type with respect to the construction of thermal isolation of the image detector.

What is claimed is:

1. A three dimensional conical horn antenna coupled image detector comprising:

a plurality of supports for supporting a horn antenna structure on the upper section of a substrate;

a horn antenna waveguide formed at the center of said horn antenna structure;

an image detector at the lower section of said horn antenna wave guide;

an absorption layer in said image detector which has an identical diameter to that of a bottom cross section of said horn antenna waveguide; and a thermal isolation leg in said image detector, which spans a greater distance than the diameter of said horn antenna wave guide.

2. The image detector as claimed in claim 1, wherein said thermal isolation leg is configured to have a circular shape in order to be capable of increasing the length of the leg.

\* \* \* \* \*